US 12,552,295 B2

(12) United States Patent
Tanabe et al.

(10) Patent No.: US 12,552,295 B2
(45) Date of Patent: Feb. 17, 2026

(54) VEHICLE SEAT

(71) Applicant: TS TECH CO., LTD., Asaka (JP)

(72) Inventors: Jinichi Tanabe, Tochigi (JP); Akira Miyoshi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 440 days.

(21) Appl. No.: 18/041,488

(22) PCT Filed: Aug. 18, 2021

(86) PCT No.: PCT/JP2021/030119
§ 371 (c)(1),
(2) Date: Feb. 13, 2023

(87) PCT Pub. No.: WO2022/044902
PCT Pub. Date: Mar. 3, 2022

(65) Prior Publication Data
US 2023/0311720 A1 Oct. 5, 2023

Related U.S. Application Data

(60) Provisional application No. 63/072,536, filed on Aug. 31, 2020.

(51) Int. Cl.
*B60N 2/22* (2006.01)
*B60N 2/02* (2006.01)
(Continued)

(52) U.S. Cl.
CPC ........... *B60N 2/22* (2013.01); *B60N 2/02246* (2023.08); *B60N 2/0276* (2013.01); *B60N 2/665* (2015.04);
(Continued)

(58) Field of Classification Search
CPC .... B60N 2/22; B60N 2/02246; B60N 2/0276; B60N 2/665; B60N 2/90; B60N 2/026;
(Continued)

(56) References Cited

U.S. PATENT DOCUMENTS 4,885,513 A * 12/1989 Sakamoto ................ B60N 2/99
297/284.9
10,843,611 B2 * 11/2020 Caruss ..................... B60N 2/99
(Continued)

FOREIGN PATENT DOCUMENTS

JP 2007-118765 A 5/2007
JP 2015-202831 A 11/2015
(Continued)

OTHER PUBLICATIONS

Japanese Office Action (w/ English Translation) for corresponding Application No. 2024036805, dated May 13, 2025, 6 pages.
(Continued)

*Primary Examiner* — Kurt Philip Liethen
(74) *Attorney, Agent, or Firm* — Dority & Manning, P.A.

(57) ABSTRACT

A vehicle seat provided in a vehicle includes: a seat body including a seat cushion and a seatback; an occupant support device displaceably provided on the seat body to press an occupant seated on the seat body; a notification device provided on the seat body to make notification to the occupant; an information acquisition device that acquires information including at least one of a surrounding environment of the vehicle and a driving state of the vehicle; and a control device that controls the occupant support device and the notification device based on the information. The notification device may be provided on the occupant support device. When the vehicle turns, the control device may cause the vibrator disposed on a side opposite from the turning direction to vibrate.

10 Claims, 15 Drawing Sheets

(51) Int. Cl.
  *B60N 2/66* (2006.01)
  *B60N 2/90* (2018.01)
  *B60W 40/08* (2012.01)
  *B60W 50/16* (2020.01)

(52) U.S. Cl.
  CPC .............. *B60N 2/90* (2018.02); *B60W 40/08* (2013.01); *B60W 50/16* (2013.01); *B60N 2002/022* (2013.01); *B60N 2/026* (2023.08); *B60N 2002/981* (2018.02); *B60W 2040/0827* (2013.01)

(58) Field of Classification Search
  CPC ........ B60N 2002/022; B60N 2002/981; B60N 2/667; B60N 2/914; B60N 2/986; B60W 40/08; B60W 50/16; B60W 2040/0827
  See application file for complete search history.

(56) References Cited

U.S. PATENT DOCUMENTS

| | | | | |
|---|---|---|---|---|
| 11,299,044 | B2* | 4/2022 | Tanabe | B60N 2/75 |
| 12,071,051 | B2* | 8/2024 | Yadomaru | B60R 22/195 |
| 2013/0026802 | A1* | 1/2013 | Freienstein | B60N 2/4279 |
| | | | | 701/45 |
| 2016/0129920 | A1* | 5/2016 | Hall | B60W 40/08 |
| | | | | 701/1 |
| 2018/0222347 | A1* | 8/2018 | Hirayama | B60N 2/767 |
| 2019/0077419 | A1 | 3/2019 | Samma et al. | |
| 2019/0084447 | A1* | 3/2019 | Lee | B60N 2/14 |
| 2019/0241099 | A1 | 8/2019 | Sugiyama et al. | |
| 2019/0255971 | A1 | 8/2019 | Sakato | |
| 2019/0315257 | A1* | 10/2019 | Caruss | B60N 2/99 |
| 2019/0366888 | A1* | 12/2019 | Saigo | B60W 40/072 |
| 2022/0305970 | A1* | 9/2022 | Yadomaru | B60R 22/195 |

FOREIGN PATENT DOCUMENTS

| | | | |
|---|---|---|---|
| JP | 2017-081464 A | | 5/2017 |
| JP | 2017081463 A | * | 5/2017 |
| JP | 2018-065459 A | | 4/2018 |
| JP | 2018070075 A | * | 5/2018 |

OTHER PUBLICATIONS

International Search Report for PCT/JP2021/030119, mailed on Oct. 26, 2021, 2 pages.

* cited by examiner

VEHICLE SEAT

CROSS REFERENCE TO RELATED APPLICATIONS

This application is the U.S. National Stage entry of International Application No. PCT/JP2021/030119, filed on Aug. 18, 2021, which, in turn, claims priority to U.S. Provisional Patent Application No. 63/072,536, filed on Aug. 31, 2020, both of which are hereby incorporated herein by reference in their entireties for all purposes.

TECHNICAL FIELD

The present invention relates to a vehicle seat.

BACKGROUND ART

Patent Document 1 discloses a vehicle seat provided with a seatback including a central portion frame, left and right side portion frames provided to be pivotable relative to the central portion frame, and an actuator for causing the left and right side portion frames to pivot. The amount of pivoting of the left and right side portion frames is controlled according to the turning direction of the vehicle.

PRIOR ART DOCUMENT(S)

Patent Document(s)

[Patent Document 1] JP2018-65459A

SUMMARY OF THE INVENTION

Task to be Accomplished by the Invention

If the shape of the seat changes when the occupant does not anticipate it, the occupant may feel discomfort. Therefore, it is preferred that when the shape of the seat changes based on the surrounding environment and/or the driving state of the vehicle, the occupant can anticipate the shape change of the seat.

In view of the foregoing background, an object of the present invention is t provide a vehicle seat that enables the occupant to anticipate a shape change of the seat.

Means to Accomplish the Task

To achieve the above object, one aspect of the present invention is a vehicle seat (1) provided in a vehicle, comprising: a seat body (8) including a seat cushion (5) and a seatback (6); an occupant support device (20) displaceably provided on the seat body to press an occupant seated on the seat body; a notification device (21) provided on the seat body to make notification to the occupant; an information acquisition device (90) that acquires information including at least one of a surrounding environment of the vehicle and a driving state of the vehicle; and a control device (76) that controls the occupant support device and the notification device based on the information.

According to this aspect, due to the notification by the notification device, the occupant can anticipate a shape change of the seat.

In the above aspect, the notification device may be provided on the occupant support device.

According to this aspect, since the notification is issued from the part where the shape of the seat changes, the occupant can properly anticipate the change of the seat shape.

In the above aspect, the occupant support device and the notification device each may be provided as a pair on left and right, the notification device may be a vibrator (31), the information acquisition device may comprise a turning state acquisition device that acquires a turning state of the vehicle, and when the vehicle turns, the control device may cause the vibrator disposed on a side opposite from a turning direction to vibrate.

According to this aspect, since the part where the occupant and the seat closely contact each other vibrates, the occupant can properly anticipate the change of the seat shape.

In the above aspect, the seat body may be provided to be rotatable about a vertical axis (A) relative to a floor (4) of the vehicle.

According to this aspect, with the rotation, the seat body can properly support the occupant at the time of turning.

In the above aspect, the information acquisition device may comprise a seat rotation angle sensor (92) that detects a rotation angle of the seat body relative to the floor about the vertical axis, and the control device may reduce an amount of actuation of the occupant support device when the rotation angle is large than when the rotation angle is small.

According to this aspect, the amount of actuation of the occupant support device is properly adjusted according to the rotation angle of the seat body.

In the above aspect, the information acquisition device may comprise a turning state acquisition device (98, 99) that acquires a turning state of the vehicle, and when the vehicle turns, the control device may cause the seat body to rotate about the vertical axis in a direction same as a turning direction.

According to this aspect, with the rotation, the seat body can properly support the occupant at the time of turning.

In the above aspect, the occupant support device may be provided as a pair on left and right, and when the vehicle turns, the control device may actuate the occupant support device disposed on a side different from the turning direction.

According to this aspect, the occupant support device can properly support the occupant when the vehicle turns.

In the above aspect, the information acquisition device may comprise a gripping sensor (93) provided on a steering wheel (71) of the vehicle, and the control device may reduce an amount of actuation of the occupant support device when the steering wheel is gripped by the occupant than when the steering wheel is not gripped.

According to this aspect, when the occupant recognizes turning of the vehicle, an unnecessary actuation of the occupant support device can be omitted. Therefore, the amount of energy consumption can be reduced.

In the above aspect, the information acquisition device may comprise a wakefulness degree acquisition device (110, 109) that detects a wakefulness degree of the occupant, and the control device may reduce an amount of actuation of the occupant support device when the wakefulness degree is high than when the wakefulness degree is low.

According to this aspect, when the occupant recognizes turning of the vehicle, an unnecessary actuation of the occupant support device can be omitted.

In the above aspect, the information acquisition device may comprise a pressure sensor (95) that is provided on the seat body to detect a pressure received from the occupant, and the control device may reduce the amount of actuation of the occupant support device when the pressure is high than when the pressure is low.

According to this aspect, when the occupant is in close contact with the seat body, an unnecessary actuation of the occupant support device can be omitted.

In the above aspect, the information acquisition device may comprise an obstacle sensor (96) that detects an obstacle present around the vehicle, and the control device may reduce an amount of actuation of the occupant support device when a distance between the vehicle and the obstacle is short than when the distance between the vehicle and the obstacle is long.

According to this aspect, when there is a risk that the vehicle may collide with an obstacle, an actuation force of the occupant support device can be suppressed to reduce the influence on the airbag.

In the above aspect, the occupant support device may comprise an air cell (42) that inflates when compressed air is supplied and a support plate (47) provided on a front end of the air cell, and the notification device may comprise a vibrator (31) provided on a side of the support plate opposite from an air cell side.

According to this aspect, the vibration of the vibrator can be efficiently transmitted to the occupant.

Effect of the Invention

To achieve the above object, one aspect of the present invention is a vehicle seat (1) provided in a vehicle, comprising: a seat body (8) including a seat cushion (5) and a seatback (6); an occupant support device (20) displaceably provided on the seat body to press an occupant seated on the seat body; a notification device (21) provided on the seat body to make notification to the occupant; an information acquisition device (90) that acquires information including at least one of a surrounding environment of the vehicle and a driving state of the vehicle; and a control device (76) that controls the occupant support device and the notification device based on the information. According to this aspect, due to the notification by the notification device, the occupant can anticipate a shape change of the seat.

In the above aspect, the notification device may be provided on the occupant support device. According to this aspect, since the notification is issued from the part where the shape of the seat changes, the occupant can properly anticipate the change of the seat shape.

In the above aspect, the occupant support device and the notification device each may be provided as a pair on left and right, the notification device may be a vibrator (31), the information acquisition device may comprise a turning state acquisition device that acquires a turning state of the vehicle, and when the vehicle turns, the control device may cause the vibrator disposed on a side opposite from a turning direction to vibrate. According to this aspect, since the part where the occupant and the seat closely contact each other vibrates, the occupant can properly anticipate the change of the seat shape.

In the above aspect, the seat body may be provided to be rotatable about a vertical axis (A) relative to a floor (4) of the vehicle. According to this aspect, with the rotation, the seat body can properly support the occupant at the time of turning.

In the above aspect, the information acquisition device may comprise a seat rotation angle sensor (92) that detects a rotation angle of the seat body relative to the floor about the vertical axis, and the control device may reduce an amount of actuation of the occupant support device when the rotation angle is large than when the rotation angle is small. According to this aspect, the amount of actuation of the occupant support device is properly adjusted according to the rotation angle of the seat body.

In the above aspect, the information acquisition device may comprise a turning state acquisition device (98, 99) that acquires a turning state of the vehicle, and when the vehicle turns, the control device may cause the seat body to rotate about the vertical axis in a direction same as a turning direction. According to this aspect, with the rotation, the seat body can properly support the occupant at the time of turning.

In the above aspect, the occupant support device may be provided as a pair on left and right, and when the vehicle turns, the control device may actuate the occupant support device disposed on a side different from the turning direction. According to this aspect, the occupant support device can properly support the occupant when the vehicle turns.

In the above aspect, the information acquisition device may comprise a gripping sensor (93) provided on a steering wheel (71) of the vehicle, and the control device may reduce an amount of actuation of the occupant support device when the steering wheel is gripped by the occupant than when the steering wheel is not gripped. According to this aspect, when the occupant recognizes turning of the vehicle, an unnecessary actuation of the occupant support device can be omitted. Therefore, the amount of energy consumption can be reduced.

In the above aspect, the information acquisition device may comprise a wakefulness degree acquisition device (110, 109) that detects a wakefulness degree of the occupant, and the control device may reduce an amount of actuation of the occupant support device when the wakefulness degree is high than when the wakefulness degree is low. According to this aspect, when the occupant recognizes turning of the vehicle, an unnecessary actuation of the occupant support device can be omitted.

In the above aspect, the information acquisition device may comprise a pressure sensor (95) that is provided on the seat body to detect a pressure received from the occupant, and the control device may reduce the amount of actuation of the occupant support device when the pressure is high than when the pressure is low. According to this aspect, when the occupant is in close contact with the seat body, an unnecessary actuation of the occupant support device can be omitted.

In the above aspect, the information acquisition device may comprise an obstacle sensor (96) that detects an obstacle present around the vehicle, and the control device may reduce an amount of actuation of the occupant support device when a distance between the vehicle and the obstacle is short than when the distance between the vehicle and the obstacle is long. According to this aspect, when there is a risk that the vehicle may collide with an obstacle, an actuation force of the occupant support device can be suppressed to reduce the influence on the airbag.

In the above aspect, the occupant support device may comprise an air cell (42) that inflates when compressed air is supplied and a support plate (47) provided on a front end of the air cell, and the notification device may comprise a vibrator (31) provided on a side of the support plate opposite from an air cell side. According to this aspect, the vibration of the vibrator can be efficiently transmitted to the occupant.

DETAILED DESCRIPTION OF THE INVENTION

In the following, an embodiment in which a vehicle seat according to the present invention is applied to a seat 2 of the vehicle 1 will be described with reference to the drawings. In the following description, the front-rear, left-right, and up-down directions are defined with respect to the vehicle 1 in which the seat 2 is provided.

Figure 1:
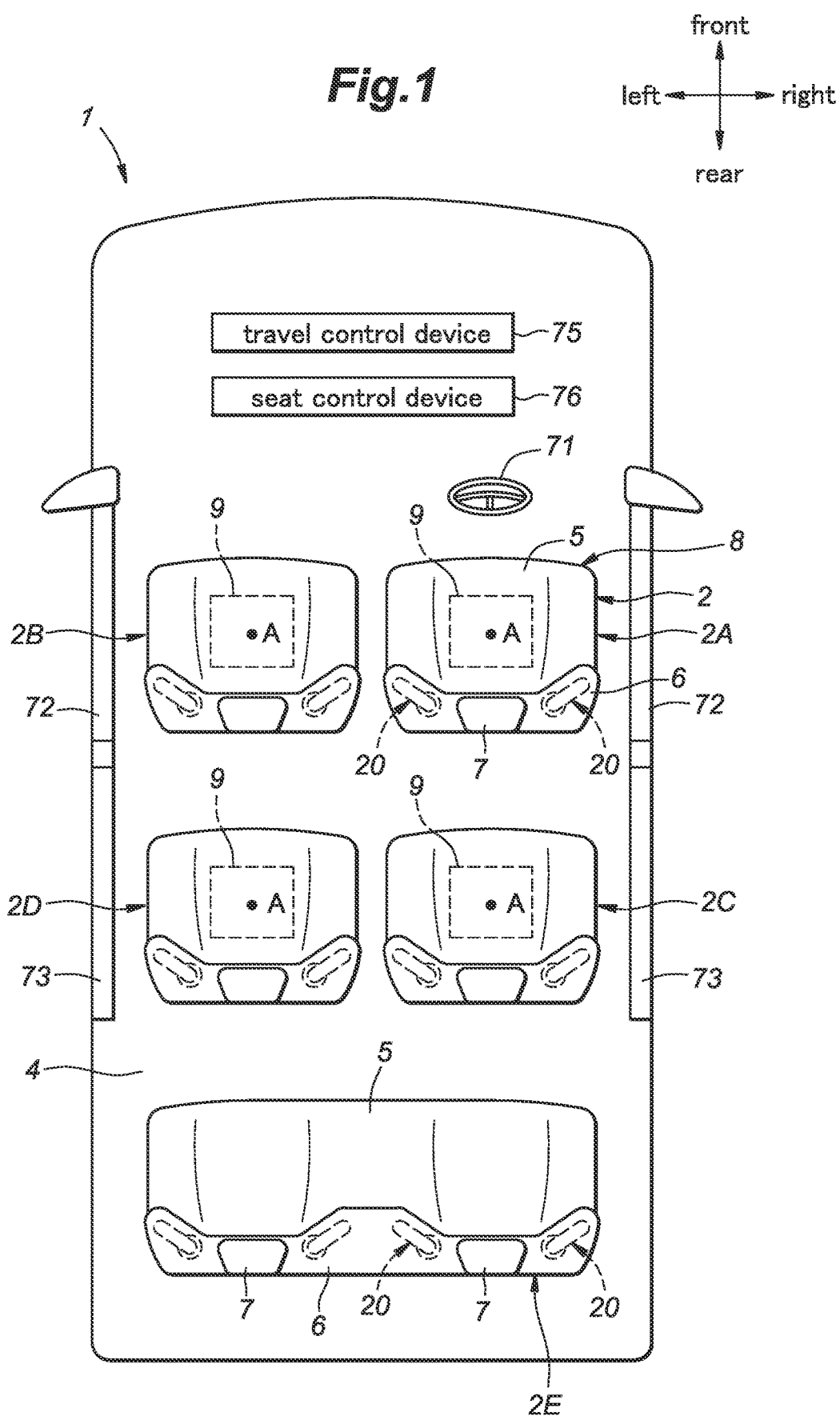
FIG. 1 shows a vehicle provided with a seat according to an embodiment.

As shown in FIG. 1, a front right seat 2A, a front left seat 2B, a middle right seat 2C, a middle left seat 2D, and a rear seat 2E are provided in the cabin of the vehicle 1. The front right seat 2A, the front left seat 2B, the middle right seat 2C, and the middle left seat 2D are one-seater seats. The rear seat 2E is a two-seater seat. The front right seat 2A is a driver's seat. Preferably, the front right seat 2A, the front left seat 2B, the middle right seat 2C, and the middle left seat 2D have an identical configuration.

Figure 2:
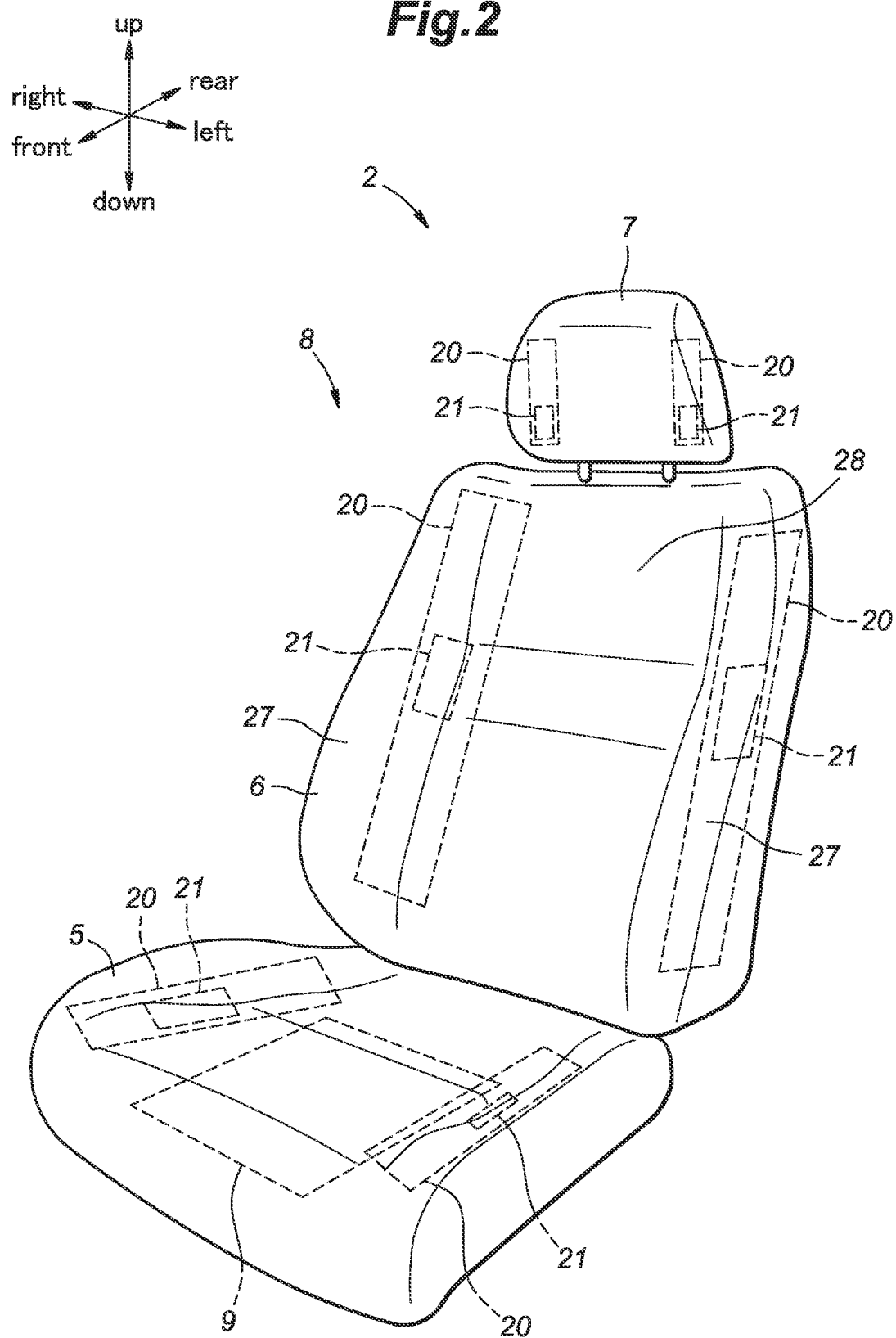
FIG. 2 is a perspective view of the seat.

As shown in FIGS. 1 and 2, the seat 2 includes a seat cushion 5 provided on the floor 4, a seatback 6 extending upward from a rear portion of the seat cushion 5, and a headrest 7 joined to an upper portion of the seatback 6. The seatback 6 is pivotably supported on the seat cushion 5. The seat cushion 5 and the seatback 6 constitute a seat body 8. The seat body 8 is provided to be rotatable relative to the floor 4 about a vertical axis. Specifically, the seat cushion 5 is supported on the floor 4 to be pivotable about a rotation axis A that extends in the vertical direction. Preferably, the seat cushion 5 is supported to be rotatable about the rotation axis A by a seat rotation device 9 provided on the floor 4. Also, the seat cushion 5 may be supported on the floor 4 to be movable in the front-rear direction via a slide device. In this case, the rotation axis A may be disposed to be movable in the front-rear direction. The slide device is preferably interposed between the seat rotation device 9 and the seat cushion 5.

Figure 3:
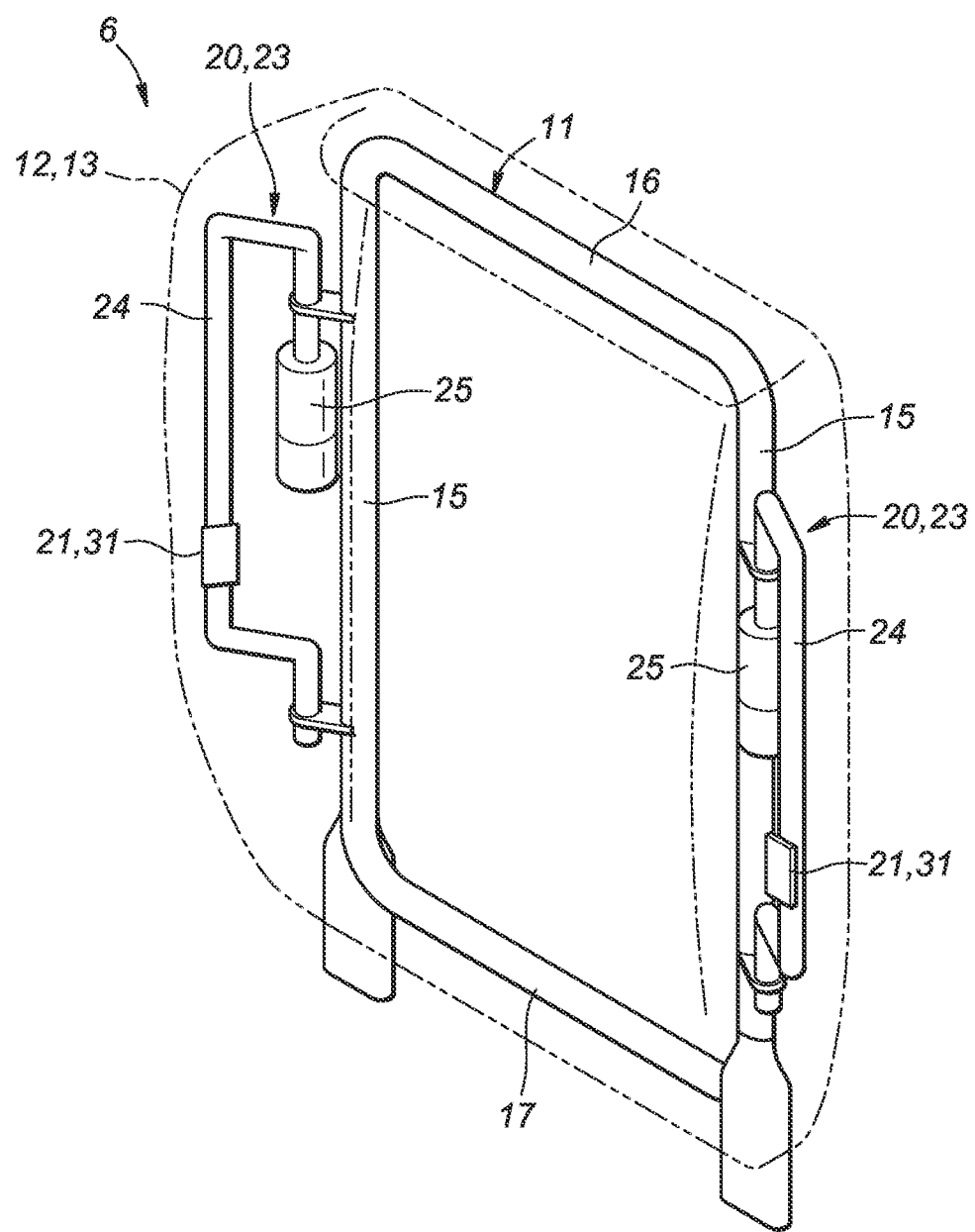
FIG. 3 is a perspective view of a seatback frame provided with a movable frame device.

The seat cushion 5 includes a seat cushion frame, a pad supported on the seat cushion frame, and a skin member covering the pad. The seatback 6 includes a seatback frame 11, a pad 12 supported on the seatback frame 11, and a skin member 13 covering the pad 12. As shown in FIG. 3, the seatback frame 11 includes left and right side members 15 that extend vertically, an upper member 16 that extends in the lateral direction and is joined to the upper ends of the left and right side members 15, and a lower member 17 that extends in the lateral direction and is joined to the lower ends of the left and right side members 15.

As shown in FIG. 2, the seat 2 includes an occupant support device 20 displaceably provided on the seat body 8 to press an occupant seated on the seat body 8 and a notification device 21 provided on the seat body 8 to make notification to the occupant. Preferably, the notification device 21 is supported on the occupant support device 20.

As shown in FIG. 3, one example of the occupant support device 20 includes a movable frame device 23. The movable frame device 23 includes left and right movable frames 24 displaceably provided on the seatback frame 11 and left and right electric motors 25 for actuating the left and right movable frames 24. The left movable frame 24 is pivotably supported on the left side member 15, and the right movable frame 24 is pivotably supported on the right side member 15. The left and right movable frames 24 are supported by the corresponding side members 15 to be pivotable about respective axes extending in parallel to the side members 15. The left and right movable frames 24 extend laterally outward from the left and right side members 15 and form seatback side portions 27, which are left and right side portions of the seatback 6. The left and right seatback side portions 27 protrude forward from a seatback central portion 28, which is a central portion of the seatback 6. The seatback side portion 27 may be also referred to as vortex portions or bank portions.

Figure 4:
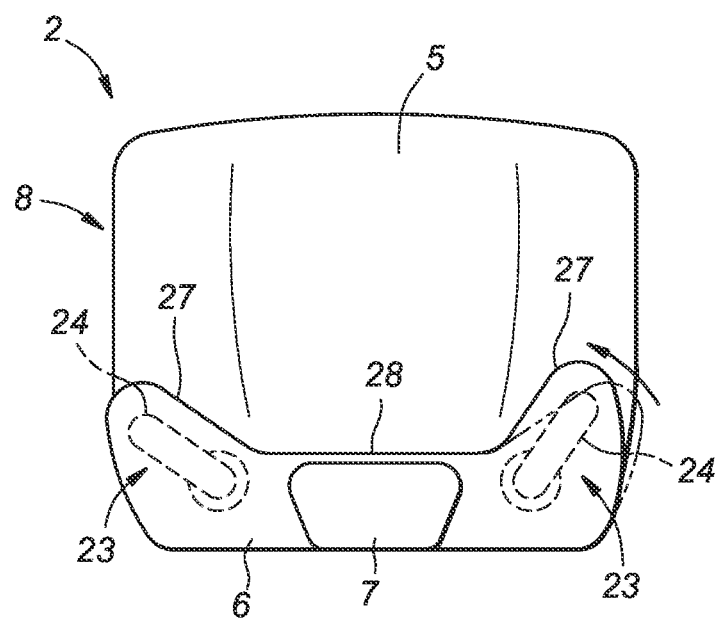
FIG. 4 is an explanatory diagram showing operation of the movable frame device.

The left and right electric motors 25 are supported on the corresponding side members 15. The electric motors 25 are each a stepping motor, for example. The drive shaft of each electric motor 25 is connected to the corresponding movable frame 24 via a speed reduction mechanism and the like. When each electric motor 25 is driven, the corresponding movable frame 24 pivots relative to the seatback 6. As shown in FIG. 4, pivoting of each movable frame 24 changes an amount of forward protrusion of the corresponding seatback side portion 27. Due to the change of the amount of forward protrusion of the left and right seatback side portions 27, the direction of the seating surface, which is a front surface of the seatback 6, changes to the left or right.

The notification device 21 may include at least one of a vibrator 31, a speaker 32, a touch panel display 33, and a warning lamp. The notification device 21 may be a display device configured by the touch panel display 33, for example (see FIG. 10). Preferably, the touch panel display 33 is provided on an instrument panel of the vehicle 1. Also, it is preferred if the notification device 21 is a speaker 32 provided on at least one of the instrument panel, the door lining, the seat cushion 5, the seatback 6, and the headrest 7 (see FIG. 10). In the present embodiment, the notification device 21 is left and right vibrators 31 which are supported on the respective movable frames 24. Each vibrator 31 includes an electric motor and an eccentric weight joined to the drive shaft of the electric motor. The vibrator 31 generates vibration when the electric motor rotates.

As shown in FIG. 3, the left and right vibrators 31 are joined to the corresponding movable frames 24. In this case, the parts of the pad 12 positioned in front of the vibrator 31 are preferably formed to have a smaller thickness than the other parts. Also, the parts of the pad 12 corresponding to the vibrators 31 may be provided with through holes. This makes it easier for the vibration of the vibrators 31 to be transmitted to the occupant. Also, the left and right vibrators 31 may be supported on the movable frames 24 via the pad 12. The left and right vibrators 31 may be disposed in front of the movable frames 24 and between the pad 12 and the skin member 13.

Figure 5:
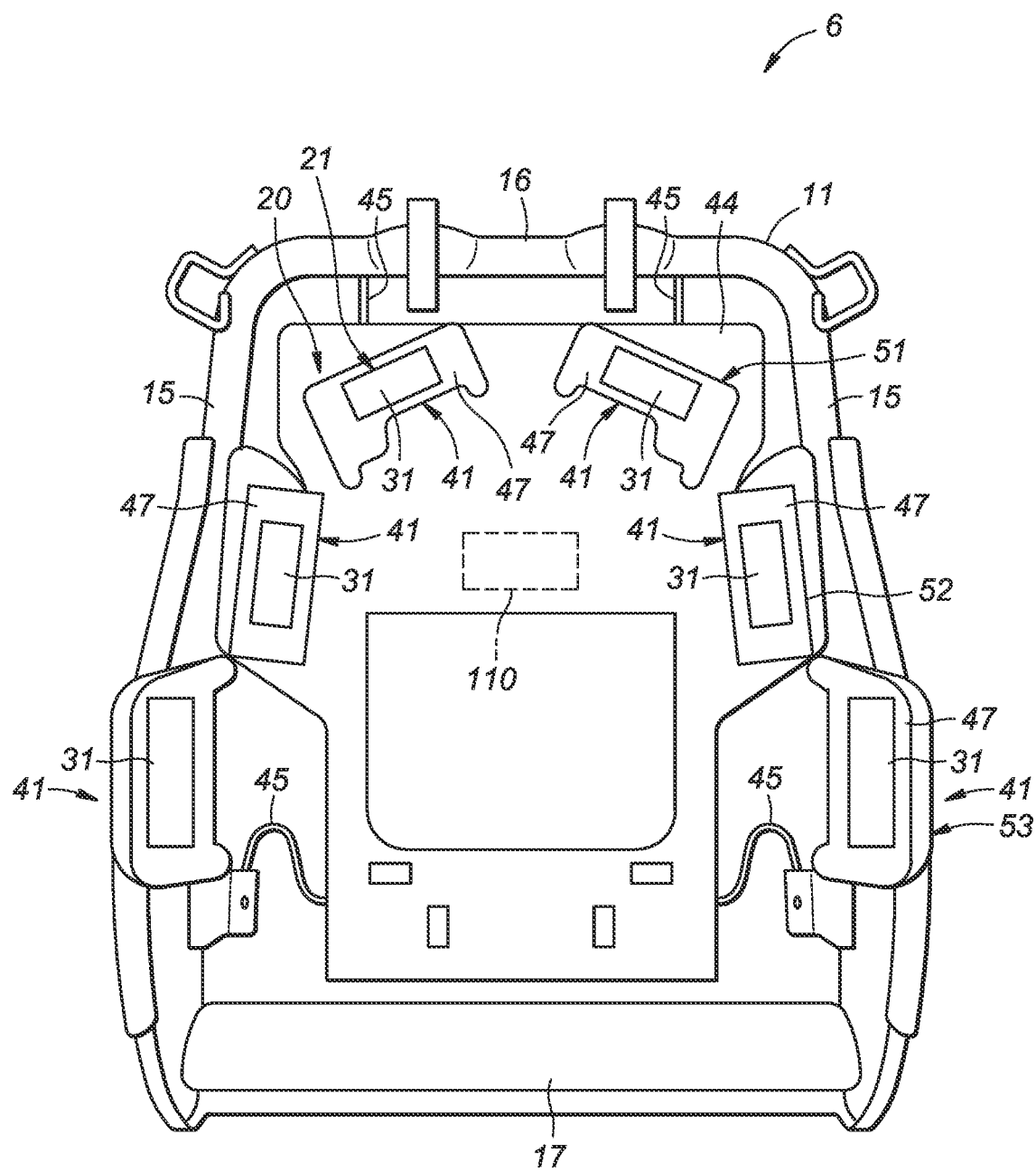
FIG. 5 is a front view of the seatback frame provided with an air cell device.

As shown in FIG. 5, another example of the occupant support device 20 includes multiple air cell devices 41 provided on the seatback frame 11. Each air cell device 41 includes an air cell 42 that is connected to a compressed air supply device and inflates when compressed air is supplied. The air cell 42 may be directly supported on the seatback frame 11 including the left and right side members 15 and the upper member 16. A plate-shaped lumber support 44 is supported by the upper member 16, and multiple air cells 42 may be provided on the front surface of the lumber support 44. The lumber support 44 is supported by wires 45 disposed to extend between the left and right side members 15. The wires 45 have flexibility.

A support plate 47 may be provided on the front end of each air cell 42. Namely, the air cell 42 is disposed between the lumber support 44 and the support plate 47. One end of the support plate 47 may be pivotably joined to the lumber support 44. When the air cell 42 inflates, the support plate 47 pivots and moves forward relative to the lumber support 44.

Figure 6:
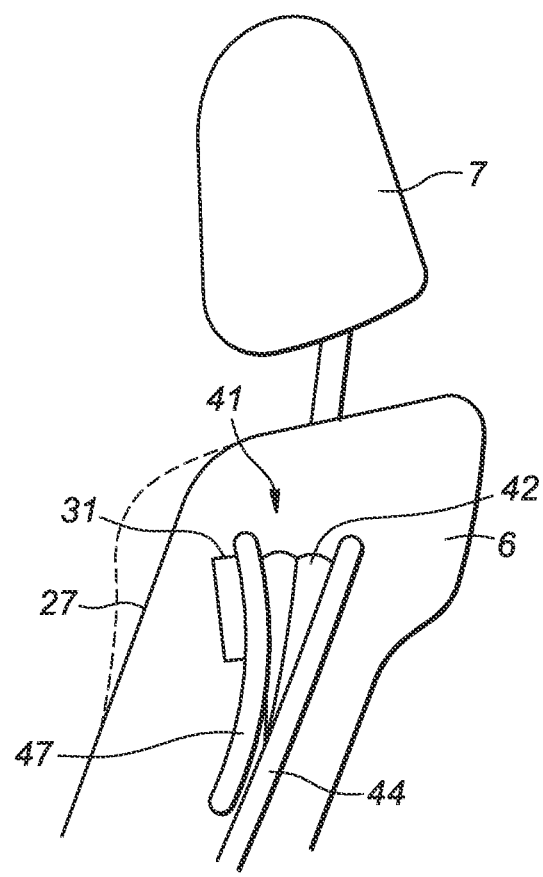
FIG. 6 is a side view of the air cell device.
Figure 7:
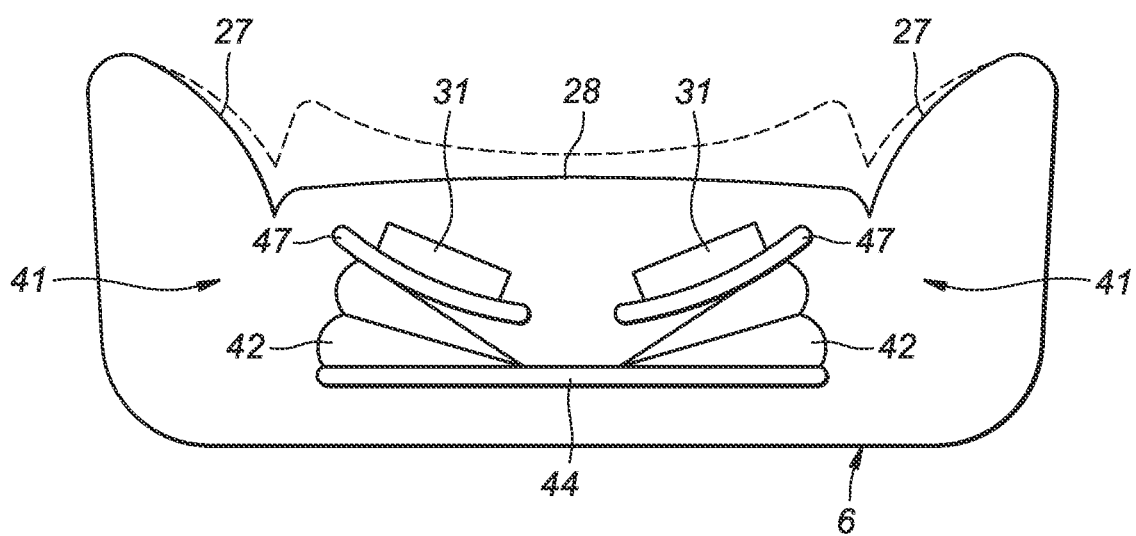
FIG. 7 is a plan view of the air cell device.

The multiple air cells 42 include a pair of left and right upper air cells 51 (see FIG. 6) provided on an upper portion of the lumber support 44, a pair of left and right middle air cells 52 (see FIG. 7) provided at positions on the lumber support 44 lower than and laterally outward of the pair of upper air cells 51, and a pair of left and right lower air cells 53 respectively provided on the left and right side members 15 at positions lower than and laterally outward of the pair of middle air cells 52. When the upper air cells 51 inflate, an upper portion protrudes more forward than a lower portion. When the middle air cells 52 and the lower air cells 53 inflate, laterally outer portions inflate more forward than laterally inner portions.

Each support plate 47 is provided with a vibrator 31 as the notification device 21. Preferably, the vibrator 31 is provided on a surface of the support plate 47 opposite from the air cell 42. Thereby, the vibration of the vibrator 31 is easily transmitted to the occupant. Also, contact between the vibrator 31 and the air cell 42 can be avoided. The vibrator 31 may be provided on the surface of the support plate 47 on the side of the air cell 42. Thereby, the vibration of the vibrator 31 is transmitted to the occupant over a wide range via the support plate 47.

Figure 8:
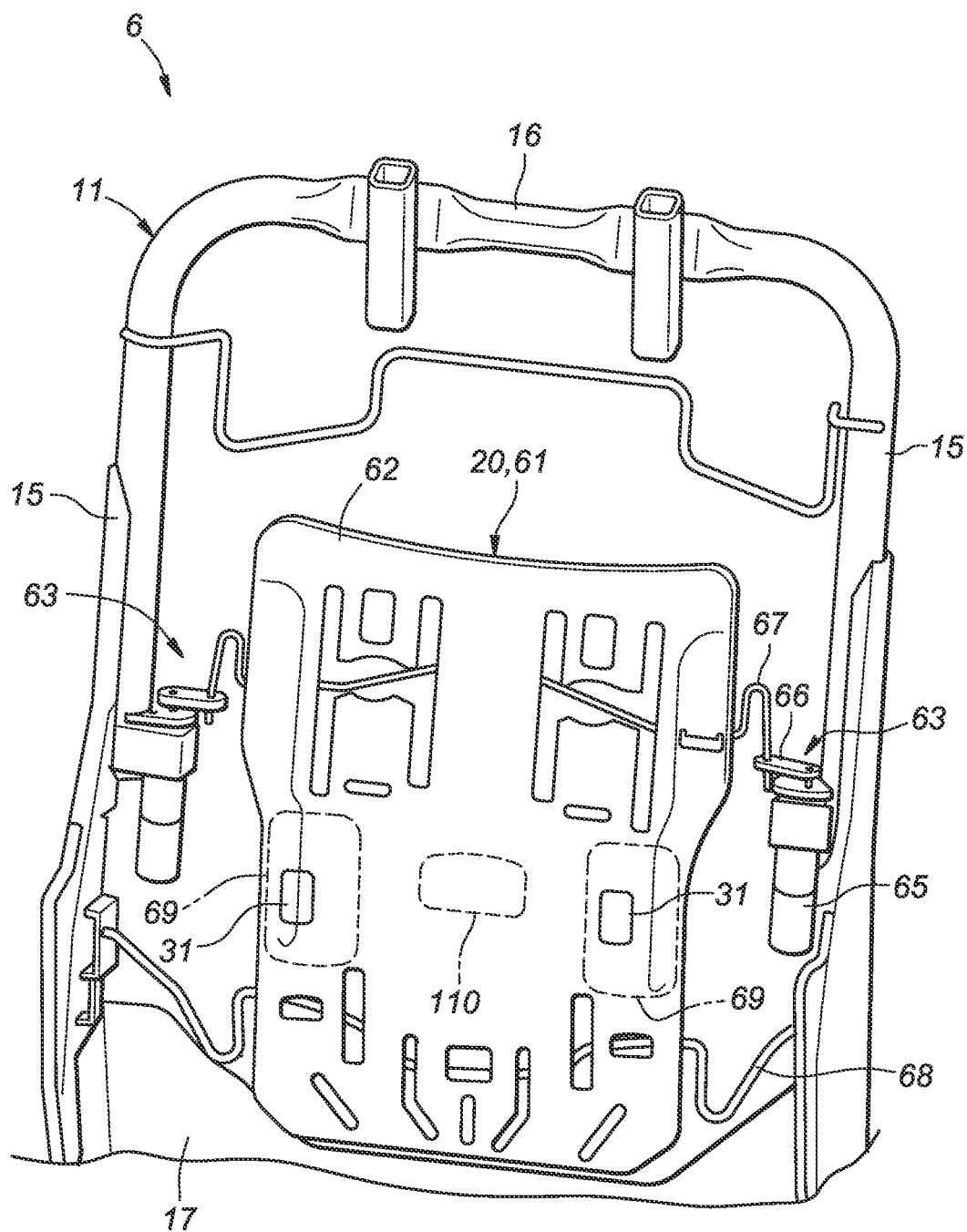
FIG. 8 is a front view of the seatback frame provided with a tilt plate device.

As shown in FIG. 8, another example of the occupant support device 20 includes a tilt plate device 61. The tilt plate device 61 includes a tilt plate 62 and a tilting device 63 for causing the tilt plate 62 to tilt relative to the seatback frame 11. The tilt plate 62 is formed in a plate shape and supports the back of the occupant. The tilting device 63 includes left and right electric motors 65 provided on the left and right side members 15, left and right links 66 respectively provided on the drive shafts of the left and right electric motors 65, a first wire 67 extending in the lateral direction and connected to the left and right links 66, and a second wire 68 extending in the lateral direction below the first wire 67 and joined to the left and right side members 15. The left and right electric motors 65 are each a stepping motor, for example. The drive shafts of the left and right electric motors 65 extend in parallel to the left and right side members 15. The left and right links 66 extend radially from the drive shafts of the left and right electric motors 65. The two ends of the first wire 67 are connected to the tips of the laterally corresponding links 66. The first wire 67 and the second wire 68 each include a bent part and can extend and contract in the longitudinal direction (lateral direction). The tilt plate 62 is supported by a central part of the first wire 67 and a central part of the second wire 68.

Figure 9:
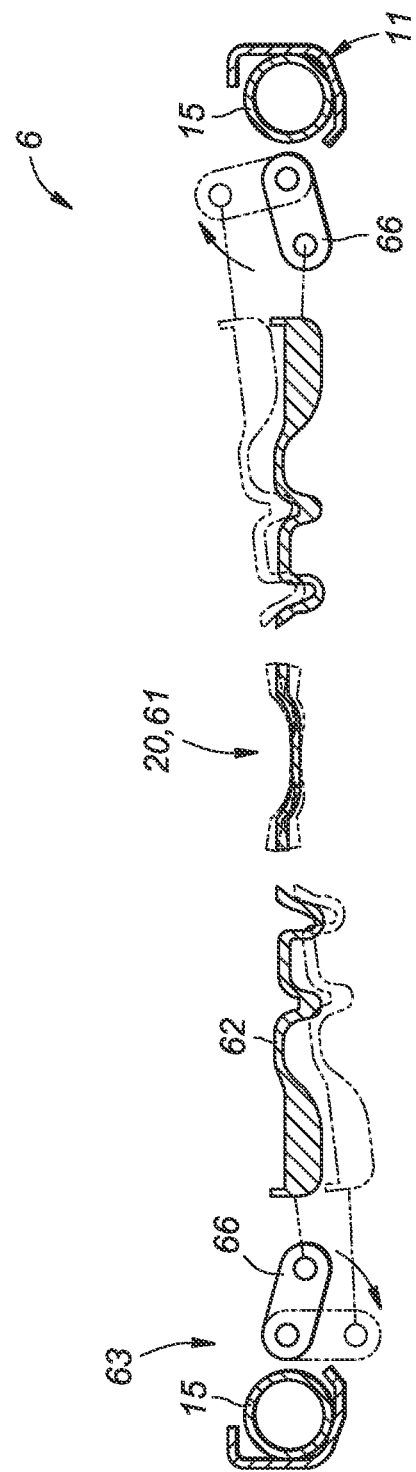
FIG. 9 is an explanatory diagram showing operation of the tilt plate device.

As shown in FIG. 9, in the initial position, the left and right links 66 extend laterally inward. As a result, the first wire 67 extends in parallel to the lateral direction and the tilt plate 62 faces forward. When the left and right electric motors 65 rotate independently, the left and right links 66 pivot independently. In a state in which the left link 66 extends rearward and the right link 66 extends forward, the first wire 67 is inclined forward from the left end toward the right end. Thereby, the tilt plate 62 tilts toward left. In a state in which the left link 66 extends forward and the right link 66 extends rearward, the first wire 67 is inclined rearward from the left end to the right end. Thereby, the tilt plate 62 tilts rightward. The second wire 68 deforms according to the tilt of the tilt plate 62.

Another example of the tilt plate device 61 preferably includes multiple tilt plates 62 and tilting devices 63 corresponding to the respective tilt plates 62. According to this aspect, the multiple tilt plates 62 can be actuated independently from each other. For example, the tilt plates 62 are preferably arranged laterally.

As shown in FIG. 8, in the case where the occupant support device 20 includes the tilt plate device 61, the vibrators 31 serving as the notification device 21 are preferably provided on the tilt plate 62. Preferably, the vibrators 31 are provided on the surface of the tilt plate 62 on the occupant side or on the surface of the tilt plate 62 opposite from the occupant. Preferably, the vibrators 31 are provided on the left side part and the right side part of the tilt plate 62, respectively. The left and right side portions of the tilt plate 62 are preferably provided with reinforcement structures 69. The reinforcement structures 69 may be formed as multiple ribs. Also, the reinforcement structures 69 may be formed by increasing the thickness of the tilt plate 62 than the other parts. The vibrators 31 are preferably provided on the front surface or the rear surface of the reinforcement structures 69. The tilt plate device 61 may also be provided on the seat cushion 5. In this case, preferably, the tilt plate 62 is disposed to face in the up-down direction, the first wire 67 and the second wire 68 are disposed to be arranged in the front-rear direction, and the left and right electric motors 65 and the links 66 are provided on the left and right side members of the seat cushion 5.

As shown in FIG. 1, the seat 2 constituting the rear seat 2E has multiple seating portions. Preferably, each seating portion is provided with an occupant support device 20 and a notification device 21 similar to those of the seat 2.

In the front portion of the cabin, a steering wheel 71 to be operated by the occupant is provided. Left and right side portions of the vehicle 1 are each provided with a front side door 72 and a rear side door 73.

Figure 10:
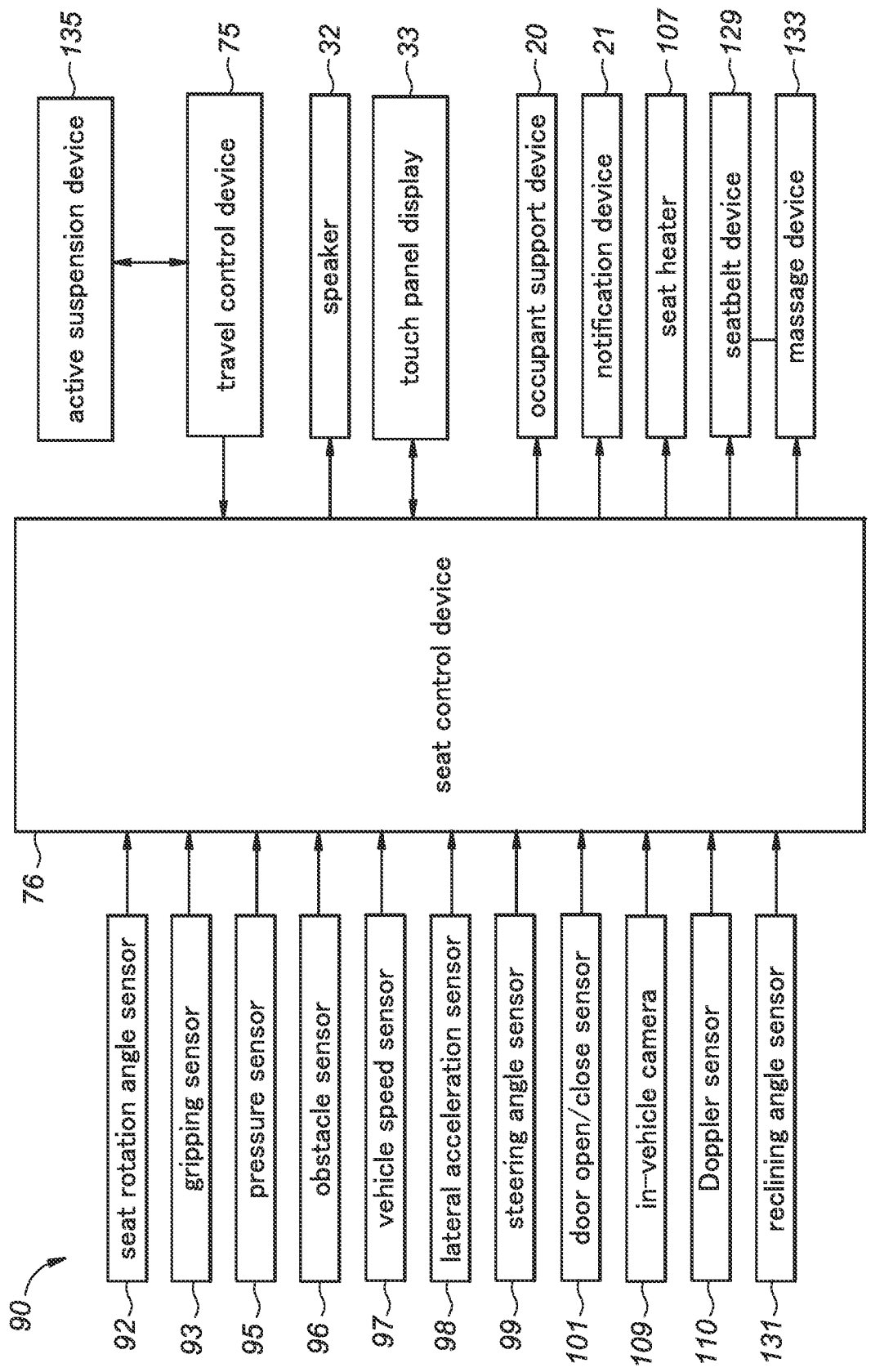
FIG. 10 is a block diagram showing a control system of the seat.

As shown in FIGS. 1 and 10, the vehicle 1 includes a travel control device 75 and a seat control device 76. The travel control device 75 and the seat control device 76 each is an electronic control unit including a processor, a volatile memory, a non-volatile memory for storing programs, and an input/output interface. The travel control device 75 and the seat control device 76 communicate with each other.

The travel control device 75 can execute an automatic driving mode and a manual driving mode. In the automatic driving mode, the travel control device 75 makes the vehicle 1 travel by controlling the drive source, the braking device, the steering device, etc. of the vehicle 1 according to the signals from the various sensors. In the manual driving mode, the travel control device 75 makes the vehicle 1 travel by controlling the drive source, the braking device, the steering device, etc. of the vehicle 1 according to the occupant's driving operation of the steering wheel 71, the accelerator pedal, and the brake pedal. Preferably, the travel control device 75 switches between the automatic driving mode and the manual driving mode according to an operation by the occupant. Preferably, the touch panel display 33 receives the switching operation of the driving mode by the occupant.

The vehicle 1 is provided with an information acquisition device 90 that acquires information including at least one of the surrounding environment of the vehicle 1 and the driving state of the vehicle 1. The seat control device 76 controls the occupant support device 20 and the notification device 21 based on the information acquired by the information acquisition device 90.

The information acquisition device 90 includes a seat rotation angle sensor 92 that detects the rotation angle of each seat 2 relative to the floor 4 about a vertical axis, a gripping sensor 93 provided on the steering wheel 71 of the vehicle, a pressure sensor that is provided on the seat 2 to detect a pressure received from the occupant, and an obstacle sensor 96 that detects an obstacle present around the vehicle 1. Preferably, the information acquisition device 90 further includes a vehicle speed sensor 97 that detects the vehicle speed of the vehicle 1, a lateral acceleration sensor 98 that detects the lateral acceleration of the vehicle 1, a steering angle sensor 99 that detects the steering angle of the steering wheel 71, and a door open/close sensor 101 that detects opening and closing of each door.

At least one of the lateral acceleration sensor 98 and the steering angle sensor 99 functions as a turning state acquisition device that acquires a turning state of the vehicle 1. The turning state includes a turning direction and a lateral acceleration. Preferably, the seat control device 76 acquires the turning state based on the lateral acceleration acquired by the lateral acceleration sensor 98. Also, the seat control device 76 preferably predicts a future turning state based on the steering angle acquired by the steering angle sensor 99 and the vehicle speed acquired by the vehicle speed sensor 97.

The gripping sensor 93 preferably is one of an electrostatic capacitance sensor, a pressure sensor, and a membrane switch provided on the steering wheel 71. The seat control device 76 determines whether the steering wheel 71 is gripped according to the signal from the gripping sensor 93.

The seat 2 is provided with an in-vehicle camera 109 and a Doppler sensor 110 serving as a wakefulness degree acquisition device. The in-vehicle camera 109 captures images of the occupant. The seat control device 76 detects an opening and closing degree of the eyelids of the occupant based on the images of the occupant captured by the in-vehicle camera 109 and acquires the wakefulness degree of the occupant from the opening and closing degree of the eyelids. The Doppler sensor 110 irradiates electromagnetic waves toward the chest of the occupant and detects the motion of the chest by detecting the frequency change of the reflected wave. The seat control device 76 acquires the period of the motion of the chest of the occupant based on the signal from the Doppler sensor 110, thereby to acquire the respiratory rate of the occupant. Then, the seat control device 76 acquires the wakefulness degree of the occupant from the respiratory rate of the occupant. In another embodiment, a wearable terminal worn on the occupant may be used as the wakefulness degree acquisition device. Preferably, the wearable terminal acquires the pulse, respiratory rate, body temperature, blood pressure, etc. of the occupant.

The Doppler sensor 110 is preferably disposed inside the seatback 6. As shown in FIG. 5, the Doppler sensor 110 is preferably supported on the seatback frame 11 or the lumber support 44. As shown in FIG. 5, in the case where the tilt plate 62 is provided instead of the lumber support 44, the Doppler sensor 110 is preferably provided on the tilt plate 62. The Doppler sensor 110 is preferably mounted on the rear surface of the lumber support 44. The Doppler sensor 110 is preferably disposed in a position not overlapping with the wires 45 as seen in the front-rear direction. The Doppler sensor 110 preferably includes locking claws or hooks and is locked on the lumber support 44 or the tilt plate 62. Also, the Doppler sensor 110 may be fastened to the lumber support 44 or the tilt plate 62 by fastening members such as screws, clips, bands, etc.

Figure 11:
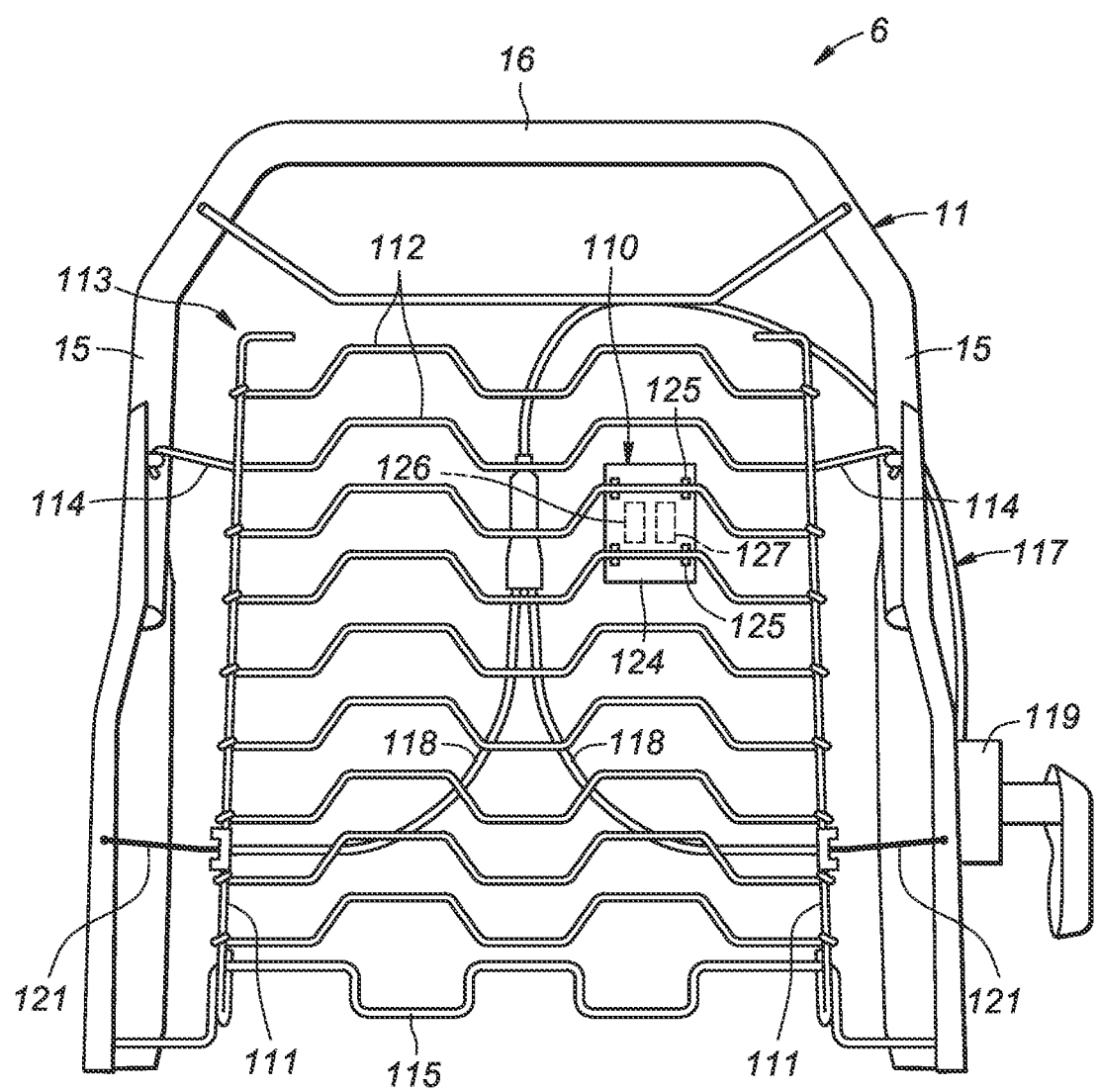
FIG. 11 is a front view of the seatback frame on which a Doppler sensor is mounted.

Also, as shown in FIG. 11, the lumber support 44 may be formed as a net structure 113 including multiple vertical wires 111 that extend vertically and multiple horizontal wires 112 that extend across the multiple vertical wires 111. An upper portion of the net structure 113 is joined to the left and right side members 15 by attachment wires 114. Below the net structure 113, a support wire 115 extending laterally and joined to the left and right side members 15 is provided. The lower portions of the multiple vertical wires 111 form rings through which the support wire 115 passes. Thereby, the lower portion of the net structure 113 is movable in the front-rear direction relative to the support wire 115. The left and right lower portions of the net structure 113 are joined to the lower portions of the left and right side members 15 by a pair of control cables 117. A sleeve 118 of each control cable 117 has a first end joined to the lower portion of the left or right vertical wire 111 and a second end joined to a take-up device 119 provided on an outer side surface of the side member 15. The portions of the two sleeves 118 on the second end side are united while the portions of the two sleeves 118 on the first end side are branched from each other. A cable 121 received in each sleeve 118 has a first end protruding out from the first end of each sleeve 118 and joined to the front edge of the side member 15 and a second end joined to the take-up device 119. When the take-up device 119 takes up the cable 121, the first end of the sleeve 118 and the first end of the cable 121 approach each other and the lower portion of the net structure 113 moves forward. The take-up device 119 may be operated by the occupant or may be driven by an electric motor.

In the case where the lumber support 44 includes the net structure 113, the Doppler sensor 110 is preferably locked on the multiple horizontal wires 112. Locking parts 125 for locking the multiple horizontal wires 112 are preferably provided on a front portion of a casing 124 of the Doppler sensor 110. The locking parts 125 are preferably hooks or clamps. Preferably, the casing 124 is made of resin and the locking parts 125 also are made of resin integrally. The Doppler sensor 110 is disposed behind the multiple horizontal wires 112. A transmitting unit 126 and a receiving unit 127 of the Doppler sensor 110 are preferably disposed in positions not overlapping with the multiple vertical wires 111 and the multiple horizontal wires 112 as seen in the front-rear direction. Namely, the transmitting unit 126 and the receiving unit 127 of the Doppler sensor 110 are preferably disposed between vertically adjacent two horizontal wires 112 and between laterally adjacent two vertical wires 111.

The pressure sensor 95 may be a membrane switch or a piezoelectric sensor. The obstacle sensor 96 may be a sonar, a laser, or a lidar.

When the vehicle 1 turns, the seat control device 76 controls the occupant support device 20 to make the seating surface of the seatback 6 face in the turning direction. The seat control device 76 acquires the turning state based on the lateral acceleration acquired by the lateral acceleration sensor 98. Also, the seat control device 76 predicts a future turning state based on the steering angle acquired by the steering angle sensor 99 and the vehicle speed acquired by the vehicle speed sensor 97. Then, the seat control device 76 controls the occupant support device 20 based on the turning state and the future turning state.

Figure 12:
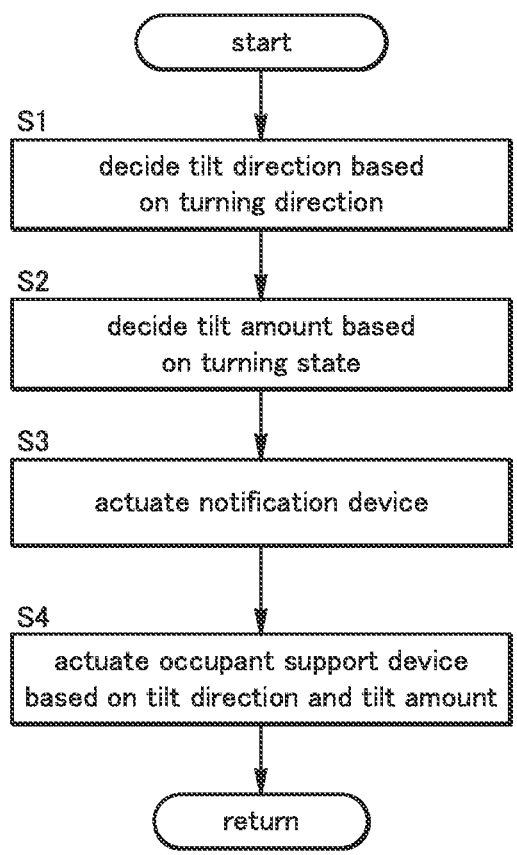
FIG. 12 is a flowchart showing a control procedure of the seat control device.

As shown in FIG. 12, the seat control device 76 first decides the tilt direction of the seating surface (front surface) of the seatback 6 based on the turning direction of the vehicle 1 (S1). When the turning direction is right, the seat control device 76 decides the tilt direction of the seating surface of the seatback 6 as right. On the other hand, when the turning direction is left, the seat control device 76 decides the tilt direction of the seating surface of the seatback 6 as left.

Next, the seat control device 76 decides the tilt amount of the seating surface of the seatback 6 based on the turning state (S2). Preferably, the seat control device 76 decides the tilt amount of the seating surface of the seatback 6 based on the absolute value of the lateral acceleration, for example. The larger the absolute value of the lateral acceleration is, the larger the tilt amount of the seating surface of the seatback 6 is set. The relationship between the absolute value of the lateral acceleration and the tilt amount of the seating surface of the seatback 6 is preferably stipulated in a map in advance.

Next, the seat control device 76 actuates the notification device 21 disposed on the side opposite from the turning direction (S3). The notification device 21 preferably is a vibrator 31. Preferably, the seat control device 76 causes the vibrator 31 to vibrate for a predetermined period.

Subsequently, the seat control device 76 controls the occupant support device 20 based on the tilt direction of the seating surface of the seatback 6 and the tilt amount of the seating surface of the seatback 6 (S4). When the occupant support device 20 starts being actuated, the actuation of the notification device 21 may have been finished or the actuation may be in progress. In the case where the occupant support device 20 is the movable frame device 23 or the air cell device 41, the movable frame device 23 and the air cell device 41 provided on the side opposite from the turning direction are actuated so that the side portion of the seat 2 on the side opposite from the turning direction protrudes forward. In the case where the occupant support device 20 is the tilt plate device 61, the tilt plate device 61 is actuated so that the front face of the tilt plate 62 faces in the turning direction. This can prevent the occupant from moving to the side opposite from the turning direction when the vehicle 1 turns. Also, since the notification device 21 makes notification to the occupant before the occupant support device 20 is actuated, the discomfort felt by the occupant can be reduced. Further, since the occupant can recognize that the vehicle 1 will turn by receiving the notification, car sickness is prevented.

In steps S1 and S2, the seat control device 76 may decide the tilt direction and the tilt amount of the seating surface of the seatback 6 based on the future turning state acquired based on the vehicle speed and the steering angle. Also, the seat control device 76 may acquire, from the map information, a curvature of the road on which the vehicle 1 will travel in future, such as 5 seconds later, for example, and predict a future turning state based on the curvature and the vehicle speed. Then, the seat control device 76 may decide the tilt direction and the tilt amount of the seating surface of the seatback 6 based on the predicted future turning state.

The seat control device 76 may determine whether the occupant is gripping the steering wheel 71 based on the signal from the gripping sensor 93 and may reduce the amount of actuation of the occupant support device 20 when the steering wheel 71 is gripped by the occupant than when the steering wheel 71 is not gripped. According to this aspect, when the occupant recognizes turning of the vehicle, an unnecessary actuation of the occupant support device 20 can be omitted.

Preferably, the seat control device 76 reduces the amount of actuation of the occupant support device 20 when the wakefulness degree is high than when the wakefulness degree is low. According to this aspect, when the occupant recognizes turning of the vehicle, an unnecessary actuation of the occupant support device 20 can be omitted.

Preferably, based on the pressure detected by the pressure sensor 95 provided on the seat body 8, the seat control device 76 reduces the amount of actuation of the occupant support device 20 when the pressure is high than when the pressure is low. When the occupant is in close contact with the seat body 8, an unnecessary actuation of the occupant support device 20 can be omitted.

Preferably, the seat control device 76 reduces the amount of actuation of the occupant support device 20 when the distance between the vehicle 1 and an obstacle is short than when the distance between the vehicle 1 and the obstacle is long. According to this aspect, when there is a risk that the vehicle may collide with an obstacle, the amount of actuation of the occupant support device 20 can be suppressed to reduce the influence of the seatback 6 on the side airbag provided on the side portion.

The seat 2 can pivot about the axis A when operated by the occupant. Namely, an angle of the seat 2 about the axis A can be arbitrarily set. The occupant may make the seat 2 face inside of the cabin or rearward. Here, with a forward facing position being 0 degrees (reference), the angle of the seat 2 about the axis A is positive when the seat is rotated clockwise and negative when the seat is rotated counterclockwise. The angle of the seat 2 is detected by the seat rotation angle sensor 92. The seat rotation angle sensor 92 preferably is a known rotation sensor such as a potentiostat and a rotary encoder.

The seat rotation device 9 preferably includes an electric motor. The seat control device 76 controls the seat rotation device 9 to make the seat 2 pivot based on the turning state of the vehicle 1. When the vehicle 1 turns, the seat control device 76 preferably makes the seat 2 pivot about the axis A in the same direction as the turning direction. Also, it is preferred that the larger the lateral acceleration of the vehicle 1 is, the larger the seat control device 76 makes the rotation angle of the seat 2. Due to rotation of the seat 2, the occupant can be properly supported at the time of turning.

Preferably, the seat control device 76 reduces the amount of actuation of the occupant support device 20 when the rotation angle of the seat 2 is large than when the rotation angle of the seat 2 is small. Thereby, the amount of actuation of the occupant support device 20 is properly adjusted according to the rotation angle of the seat 2.

The seat control device 76 preferably actuates the seat rotation device 9 to make the seat 2 pivot based on at least one of the road situation as the surrounding environment and the driving situation. The road situation includes information acquired by various sensors such as a radar, a lidar, and a camera, the shape and curvature of the road included in the map information, and received road traffic information such as traffic jam information. The driving situation includes a vehicle speed, a forward-backward acceleration, a lateral acceleration, a yaw rate, an accelerator operation amount, a brake operation amount, turn signal operation information, an inter-vehicle distance between the own vehicle and another vehicle, a distance between the own vehicle and an obstacle, and so on. Preferably, the smaller the radius of curvature of the road becomes, the more the seat control device 76 increases the rotation angle of the seat 2.

The seat control device 76 may arbitrarily set the rotation angle of the seat 2 to, for example, 5 degrees, 10 degrees, 15 degrees, 20 degrees, 25 degrees, 30 degrees or the like, according to the radius of curvature of the road. Also, the seat control device 76 may limit the upper limit value of the rotation angle of the seat 2 to 30 degrees, for example. Also, the seat control device 76 may fix the rotation angle of the seat 2 to 0 degrees when the vehicle 1 changes the lane.

The seat control device 76 acquires the driving mode based on the signal from the travel control device 75. When the driving mode is the manual driving mode, the seat control device 76 prohibits the rotation of the right front seat 2 corresponding to the driver's seat and permits the rotation of the other seats 2. When the driving mode is the automatic driving mode, the seat control device 76 permits the rotation of the right front seat 2 corresponding to the driver's seat similarly to the other seats 2.

The seat control device 76 may operate the seat rotation device 9 in coordination with or independently from the actuation of the occupant support device 20.

As shown in FIG. 2, the occupant support device 20 and the notification device 21 may also be provided on the seat cushion 5 and the headrest 7. Further, when the seat 2 includes an ottoman, the occupant support device 20 and the notification device 21 may also be provided on the ottoman. The occupant support device 20 may be the movable frame device 23, the air cell device 41, or the tilt plate device 61 described above, and is preferably provided on left and right side portions of an upper part of the seat cushion 5, left and right side portions of a front part of the headrest 7, and left and right side portions of a front part of the ottoman. Preferably, the left and right side portions of each of the seat cushion 5, the headrest 7, and the ottoman protrude relative to the central portion.

In a case where multiple occupant support devices 20 are provided, preferably, the seat control device 76 gives priority to actuation of the occupant support device 20 provided on the seatback 6. The seat control device 76 preferably gives next priority to actuation of the occupant support device 20 provided on the seat cushion 5. Further, the seat control device 76 preferably gives next priority o actuation of the rotation device of the seat 2. In a case where the headrest 7 and the ottoman also are provided with occupant support devices 20, the seat control device 76 preferably actuates the devices in order of priority, the occupant support device 20 provided on the seatback 6, the occupant support device 20 provided on the seat cushion 5, the occupant support devices 20 provided on the headrest 7 and the ottoman, and the rotation device of the seat 2. Alternatively, the seat control device 76 may actuate the devices in order of priority, the occupant support device 20 provided on the seatback 6, the occupant support device 20 provided on the seat cushion 5, the rotation device of the seat 2, the occupant support devices 20 provided on the headrest 7 and the ottoman. The seat control device 76 may raise the priority degree of the occupant support device 20 with a smaller amount of electric power consumption. The priority degrees of the occupant support devices 20 actuated by the seat control device 76 can be changed by operating the touch panel display 33.

As shown in FIG. 10, the seat control device 76 may be connected to a seatbelt device 129 for pulling in the seatbelt to restrain the occupant. The seat control device 76 may actuate the seatbelt device 129 simultaneously with the occupant support device 20, to pull in the seatbelt and increase the force restraining the occupant. Due to the increase of the force restraining the occupant by the seatbelt device 129, the occupant is brought into close contact with the occupant support device 20, and therefore, the occupant support device 20 can efficiently support the occupant. Preferably, the seat control device 76 acquires the distance between the own vehicle and another vehicle based on the signal from the obstacle sensor 96 and pulls in the seatbelt with the seatbelt device 129 when the distance between the own vehicle and another vehicle is less than or equal to a predetermined threshold value.

The occupant support device 20 may use at least two of the movable frame 24, the air cell 42, and the tilt plate device 61 in combination. In this case, the seat control device 76 preferably selects the tilt plate device 61 as the occupant support device 20 to be actuated when the wakefulness degree of the occupant is low.

The seat control device 76 may simultaneously actuate the multiple occupant support devices 20. In this case, the seat control device 76 may reduce the amount of actuation of each occupant support device 20 and at the same time may shorten the actuation period. The occupant may select the occupant support device 20 to be used by operating the touch panel display 33. The seat control device 76 preferably decides the occupant support device 20 to be actuated according to the selection signal from the touch panel display 33. The seat control device 76 may learn the result of selection of the occupant support device 20 by the occupant and decide the occupant support device 20 to be used according to the learning result.

The seat control device 76 may set a degree of danger based on the driving situation and change the notification device 21 to be actuated according to the degree of danger. When the degree of danger is level 1, which is relatively low, the seat control device 76 preferably makes the touch panel display 33 display a notification image or the speaker 32 generate a notification sound. When the degree of danger is level 2, which is higher than level 1, the seat control device 76 preferably actuates the vibrator 31 provided on the seat 2. When the degree of danger is level 3, which is higher than level 2, the seat control device 76 preferably actuates the occupant support device 20 provided on the seat 2.

When detecting abnormality of the information acquisition device 90 based on the road situation as the surrounding environment or the driving situation, the seat control device 76 may restrict the actuation of the occupant support device 20. In this case, the seat control device 76 may prohibit the actuation of the occupant support device 20 or may reduce the amount of actuation than usual. The detection of abnormality is preferably performed based on the road situation, for example. For example, when the radius of curvature, irregularities, inclination, or branch shape of the road exhibits an abnormal value deviating from a predetermined range, it may be determined that abnormality has occurred in the obstacle sensor 96 including a camera, a radar (millimeter wave radar), and a lidar or in the map information. Preferably, abnormality of the occupant support device 20 is determined based on the electric current value of the electric motor 25, the pressure of the air cell 42, etc. The seat control device 76 preferably sets an abnormality level according to the degree of the abnormal value.

The seat control device 76 preferably changes the amount of actuation of the occupant support device 20 according to the abnormality level. Preferably, the higher the abnormality level is, the more the seat control device 76 reduces the amount of actuation of the occupant support device 20. Also, the seat control device 76 may prohibit the actuation of the occupant support device 20 when the abnormality level is higher than or equal to a predetermined value.

The seat control device 76 may be connected to a seat heater 107 provided on the seating surface of the seatback 6 and the seat cushion 5. The seat heater 107 preferably includes a sheet-shaped member such as an unwoven fabric, for example, and a heating wire joined to the sheet-shaped member. The seat heater 107 is disposed between the pad 12 and the skin member 13. The seat control device 76 controls the electric power supply to the seat heater 107. The seat control device 76 may reduce the amount of supply of electric power to the seat heater 107 when the occupant support device 20 is used than when the occupant support device 20 is not used. Also, the seat control device 76 may reduce the amount of actuation of the occupant support device 20 when the seat heater 107 is used than when the seat heater 107 is not used. Thereby, increase of temperature at the part closely contacting the occupant can be suppressed.

The seat control device 76 may be connected to multiple pressure sensors 95 provided on the seating surface of the seatback 6 and the seat cushion 5 to detect the motion of the occupant. The multiple pressure sensors 95 may be piezoelectric sensors or membrane switches. Preferably, the seat control device 76 stores applications for exercises and games and executes the applications according to the input from the multiple pressure sensors 95. Preferably, the applications display application images on the touch panel display 33 or a mobile terminal such as a smartphone used by the occupant. The seat control device 76 may prohibit use of an application such as a game when the occupant support device 20 is actuated. Also, the seat control device 76 may reduce the amount of actuation of the occupant support device 20 when an application such as a game is used than when the application is not used.

The seat control device 76 may be connected to the in-vehicle camera 109 that captures images of the occupant and control the occupant support device 20 based on the image information from the in-vehicle camera 109. Preferably, the seat control device 76 controls the occupant support device 20 according to the driving mode. The seat control device 76 preferably reduces the amount of actuation of the occupant support device 20 in the manual driving mode than in the automatic driving mode.

The seat control device 76 may control the occupant support device 20 according to a seat mode. The seat mode includes a normal mode and a relax mode. The seat mode may further include a business mode (learning mode). The seat control device 76 preferably determines the normal mode and the relax mode based on the reclining angle of the seatback 6. The reclining angle is preferably acquired by a reclining angle sensor 131 provided at a coupling part between the seat cushion 5 and the seatback 6. Preferably, the seat control device 76 determines the normal mode and the business mode based on the position of a stowable table provided on the seat 2 or the lighting state of the interior light, for example. The seat control device 76 preferably determines that the seat mode is the business mode when the table is deployed or the interior light is on, for example.

Preferably, the seat control device 76 increases the amount of actuation of the occupant support device 20 when the seat mode is the relax mode than when the seat mode is the normal mode. Thereby, the occupant support device 20 can support the occupant reliably. On the other hand, the seat control device 76 may reduce the amount of actuation of the occupant support device 20 when the seat mode is the relax mode than when the seat mode is the normal mode. Thereby, it is possible to reduce discomfort imparted by the occupant support device 20 to the occupant in the relaxed state.

Preferably, the seat control device 76 increases the amount of actuation of the occupant support device 20 when the seat mode is the business mode than when the seat mode is the normal mode. Thereby, the occupant support device 20 reliably supports the occupant, and therefore, it is easy for the occupant to work. On the other hand, the seat control device 76 may reduce the amount of actuation of the occupant support device 20 when the seat mode is the relax mode than when the seat mode is the normal mode. Thereby, it is possible to reduce discomfort imparted by the occupant support device 20 to the occupant in the relaxed state.

The seat control device 76 may be connected to a massage device 133 provided on the seat cushion 5 and the seatback 6. The massage device 133 preferably includes an air cell that inflates when compressed air is supplied, for example. Preferably, the seat control device 76 increases the amount of actuation of the occupant support device 20 when the massage device 133 is actuated than when the massage device 133 is not actuated. Thereby, the occupant support device 20 can support the occupant reliably. On the other hand, the seat control device 76 may reduce the amount of actuation of the occupant support device 20 when the massage device 133 is actuated than when the massage device 133 is not actuated. Thereby, the action of the massage device 133 can be transmitted to the occupant reliably. The seat control device 76 may prohibit the actuation of the massage device 133 according to the turning state. Preferably, the seat control device 76 prohibits the actuation of the massage device 133 when the lateral acceleration is greater than or equal to a predetermined value or when the radius of curvature of the traveling path acquired from the map information is less than or equal to a predetermined value.

The occupant support device 20 may function as the notification device 21. For example, the occupant support device 20 may make notification to the occupant by being actuated to vibrate. The occupant support device 20 may be actuated normally after being actuated to vibrate. Thereby, it is possible to notify the occupant that the occupant support device 20 will be actuated.

When multiple occupant support devices 20 are provided like the movable frame devices 23 and the air cell devices 41, it is preferred to actuate the devices independently from each other.

The seat control device 76 predicts a predicted lateral acceleration value, which is a lateral acceleration generated after a predetermined period, based on the road situation or the driving situation. Then, when the predicted lateral acceleration value is greater than or equal to a predetermined threshold value, the seat control device 76 actuates the occupant support device 20 and the notification device 21. The seat control device 76 may actuate the occupant support device 20 and the notification device 21 at different timings. Also, the seat control device 76 may advance the timing at which the notification device 21 is actuated than the timing at which the occupant support device 20 is actuated. Also, the seat control device 76 may make the timing at which the notification device 21 is actuated coincide with the timing at which the occupant support device 20 is actuated.

The notification device 21 that is actuated when the vehicle 1 turns may be changed according to the selection by the occupant. The touch panel display 33 may receive a selection operation of the occupant and the seat control device 76 may decide the notification device 21 to be actuated according to the selection operation. For example, when the vehicle 1 turns right, the notification device 21 disposed on the right side of the seat 2 may make notification.

When the vehicle 1 turns, the seat control device 76 may make the touch panel display 33 display images or characters indicating the turning direction and the movement of the vehicle 1 along with actuation of the notification device 21. Further, the seat control device 76 may make the speaker 32 output a voice indicating the turning direction and the movement of the vehicle 1. Preferably, the seat control device 76 actuates the touch panel display 33 and the speaker 32 a predetermined time before actuating the occupant support device 20. The seat control device 76 may change the predetermined time according to the vehicle speed or the forward-backward acceleration of the vehicle 1. Preferably, the greater the vehicle speed or the forward-backward acceleration the vehicle 1 is, the longer the seat control device 76 makes the predetermined time.

When the vehicle 1 turns, the seat control device 76 may prohibit the actuation of the occupant support device 20 and the notification device provided on the same side as the turning direction. Since the occupant support device 20 and the notification device provided on the same side as the turning direction when the vehicle 1 turns contact the occupant less closely, the amount of energy consumption can be reduced by prohibiting the actuation.

The vibrators 31 serving as the notification device 21 may be provided on the side of the occupant support device 20 opposite from the pad 12. Namely, the vibrators 31 may be provided in the seatback 6 on the rear surface of the movable frame 24, the rear surface of the air cell 42, and the rear surface of the tilt plate 62. Thereby, the vibrators 31 vibrate the occupant support device 20, and the vibration is transmitted to the occupant seated on the seat 2 via the occupant support device 20. Namely, the occupant can receive the vibration over a relatively wide region. In the case where the notification device 21 and the occupant support device 20 are provided on the seat cushion 5, it is preferred that the notification device 21 is provided on a lower side of the occupant support device 20.

The notification device 21 may include both the vibrator 31 and the speaker 32. Preferably, the seat control device 76 first actuates the speaker 32 and actuates the vibrator 31 after a delay. At this time, the seat control device 76 preferably actuates the speaker 32 and the vibrator 31 disposed in the same region. For example, when the vehicle 1 turns right, it is preferred that the seat control device 76 first actuates the speaker 32 provided on the left side of the seat 2 and subsequently actuates the vibrator 31 provided on the left side of the seat 2 after a predetermined period has elapsed. Since the occupant first receives notification as a voice from the speaker 32 and subsequently receives notification as a vibration from the vibrator 31, the occupant can reliably recognize the notification.

The occupant support device 20 and the notification device 21 may be omitted from the seatback 6. In the case where the occupant support device 20 and the notification device 21 are provided on the seatback 6, it is preferred that the occupant support device 20 and the notification device 21 are provided in positions not horizontally overlapping with the side airbag device provided in the side portion of the seatback 6. Thereby, the occupant support device 20, the notification device 21, and the side airbag device can be compactly arranged in the side portion of the seatback 6.

The vehicle 1 may be provided with an active suspension device 135. The active suspension device 135 is provided between the vehicle body and the wheel and can change the expansion and contraction state or the spring characteristics. The active suspension device 135 expands and contracts under the driving force of an oil pressure device, an air pressure device, or an electric motor 25, for example. The travel control device 75 controls the active suspension device 135 to suppress vertical movement and vibration of the vehicle body. When the seat control device 76 determines, based on the signal from the travel control device 75, that the travel control device 75 is controlling the active suspension device 135, the seat control device 76 may reduce the amount of actuation of the occupant support device 20. Also, when the seat control device 76 determines, based on the signal from the travel control device 75, that the travel control device 75 is controlling the active suspension device 135, the seat control device 76 may prohibit the actuation of the occupant support device 20.

The notification device 21 may include a vibrator 31 provided on the steering wheel 71. The seat control device 76 may cause the vibrator 31 provided on the seat 2 and the vibrator 31 provided on the steering wheel 71 to vibrate in coordination.

The seat control device 76 may actuate the notification device 21 when the level of automatic driving changes in the case where the driving mode is the automatic driving mode. For example, the seat control device 76 may actuate the notification device 21 when the level of automatic driving changes from the level at which driving is mainly performed by the car (level 3) to the level at which driving is mainly performed by the person (level 2).

Figure 13:
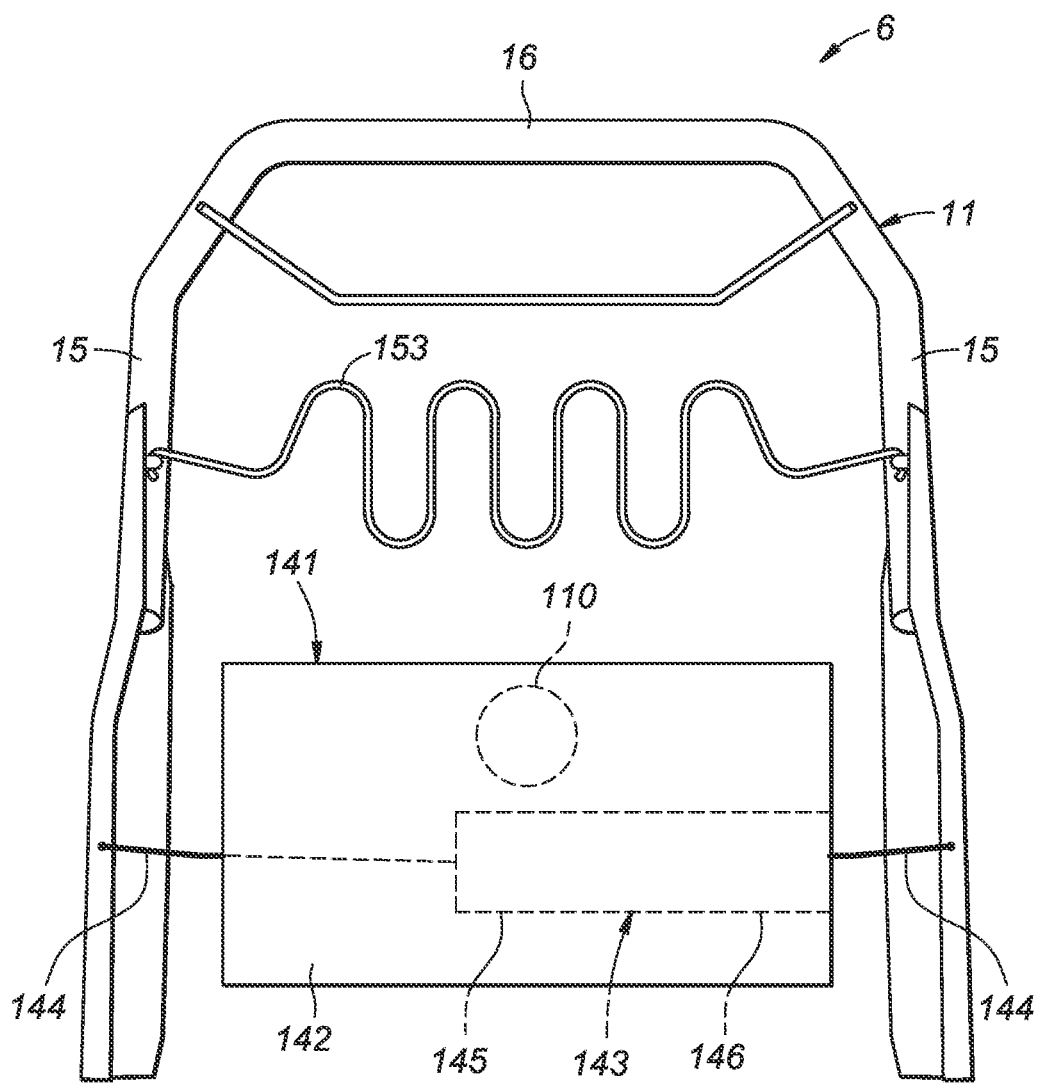
FIG. 13 is a front view of the seatback frame on which the Doppler sensor is mounted.

As shown in FIG. 13, the occupant support device 20 may be a lumber support 141. The lumber support 141 includes a plate-shaped plate member 142 and a suspension device 143 that connects the plate member 142 to the left and right side members 15. The suspension device 143 includes a flexible wire 144 connected to the left and right side members 15 and an adjustment mechanism 145 that adjusts the length of the wire 144. The adjustment mechanism 145 includes an adjustment mechanism case 146, and a drum and an electric motor contained in the adjustment mechanism case 146. A part of the wire 144 is wound around the drum. The adjustment mechanism case 146 is joined to the rear surface of the plate member 142.

The electric motor causes the drum to rotate. When the drum rotates in the positive direction, the wire 144 is taken up and the length of the wire 144 extending out from the adjustment mechanism case 146 becomes shorter. Thereby, the plate member 142 approaches the coupling parts of the wire 144 with the left and right side members 15. Also, the movable range of the plate member 142 relative to the side members 15 becomes smaller. On the other hand, when the drum rotates in the negative direction, the wire 144 is drawn out and the length of the wire 144 extending out from the adjustment mechanism case 146 becomes longer. Thereby, the plate member 142 can move away from the coupling parts of the wire 144 with the left and right side members 15. Also, the movable range of the plate member 142 relative to the side member 15 becomes larger.

The adjustment mechanism case 146 extends laterally. The adjustment mechanism case 146 is disposed on a vertically middle part of the plate member 142. The wire 144 extends laterally outward from the left and right end portions of the adjustment mechanism case 146. As seen from front, the Doppler sensor 110 serving as a biosensor is disposed in a position not overlapping with the adjustment mechanism case 146 and the wire 144. Preferably, the Doppler sensor 110 is disposed above or below the adjustment mechanism case 146 and the wire 144.

Figure 14:
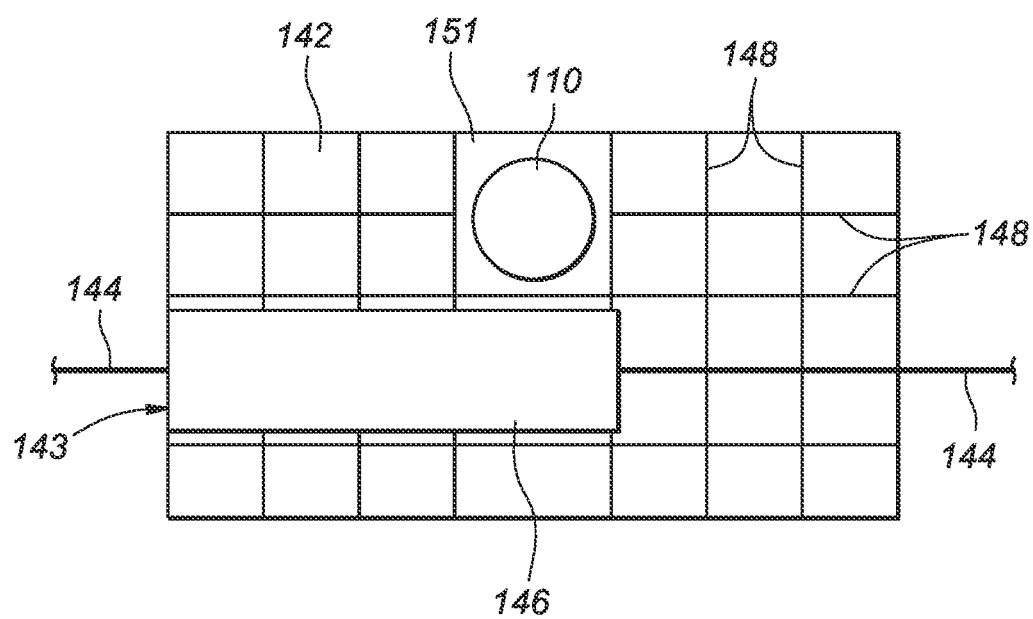
FIG. 14 is a rear view of a lumber support on which the Doppler sensor is mounted.

The plate member 142 is made of resin. As shown in FIG. 14, the plate member 142 is provided with multiple ribs 148. The ribs 148 enhance the stiffness of the plate member 142. The multiple ribs 148 preferably extend in the vertical direction and the lateral direction. The multiple ribs 148 are preferably disposed in a grid pattern. The multiple ribs 148 are preferably provided on the rear surface of the plate member 142. The rear surface of the plate member 142 is formed with a recess 151 surrounded by the multiple ribs 148. In the recess 151, the ribs 148 are not provided. As a result, the thickness of the plate member 142 in the front-rear direction is small in the recess 151. Preferably, the Doppler sensor 110 is disposed in the recess 151. The Doppler sensor 110 irradiates radio waves toward the front through the plate member 142. In this way, the Doppler sensor 110 is disposed in a position avoiding the wire 144, the adjustment mechanism case 146, and the ribs 148. The Doppler sensor 110 may be disposed in a position laterally displaced from the lateral center of the plate member 142. The spine part of the back of the occupant is recessed relative to the left and right portions thereof. Therefore, when the Doppler sensor 110 is disposed in a position laterally displaced from the center, the Doppler sensor 110 is disposed at a part where the back of the occupant and the plate member 142 contact each other closely.

Above the lumber support 141, a wire 153 extending laterally and joined the left and right side members 15 is preferably provided.

Instead of the Doppler sensor 110, other biosensors may be provided on the plate member 142. The other biosensors include, for example, a temperature sensor, a humidity sensor, and a pressure sensor.

By disposing the Doppler sensor 110 on the rear surface of the plate member 142, the degree of freedom of the layout of the Doppler sensor 110 is improved. This allows the Doppler sensor 110 to be disposed in a position appropriate for the occupant. Also, since the Doppler sensor 110 is disposed on the rear surface of the plate member 142, the Doppler sensor 110 is prevented from obstructing bending of the plate member 142. Therefore, the plate member 142 can deform flexibly and support the back of the occupant properly.

Figure 15:
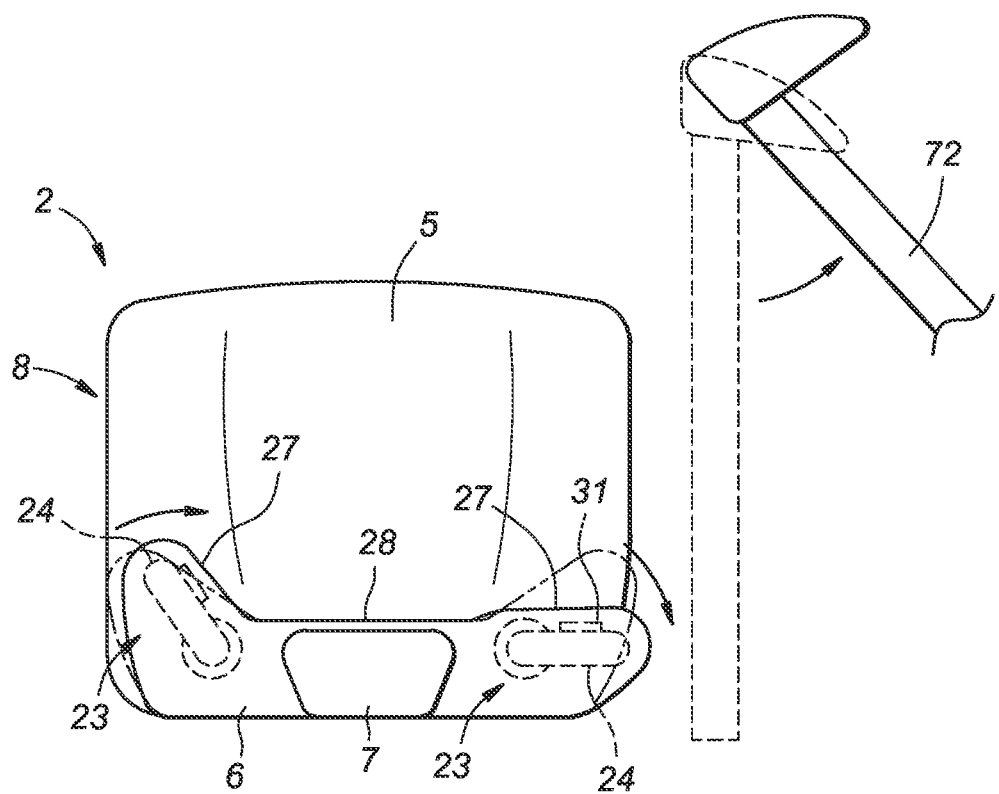
FIG. 15 is an explanatory diagram showing operation of the movable frame device when the door is opened.

As shown in FIG. 15, preferably, the seat control device 76 acquires the open/closed state of the door 72 based on the signal from the door open/close sensor 101, and when opening of the door 72 is detected, actuates the occupant support device 20 of the seat 2 corresponding to the door 72 while actuating the notification device 21. Specifically, the movable frame 24 of the seat 2 on the side of the door 72 (on the right side) is caused to pivot rearward while the movable frame 24 of the seat 2 on the side opposite from the door 72 (on the left side) is caused to pivot forward. Thereby, the amount of forward protrusion of the seatback side portion 27 on the right side of the seat 2 is reduced so that the occupant can easily move toward the door 72, while the amount of forward protrusion of the seatback side portion 27 on the left side of the seat 2 is increased to turn the occupant toward the door 72. At this time, from the vibration of the vibrator 31, the occupant can recognize that the door 72 is opened. The vibrator 31 may be actuated before the actuation of the movable frame device 23 or may be actuated simultaneously with the actuation of the movable frame device 23.

Concrete embodiments have been described in the foregoing, but the present invention is not limited to the above embodiments and may be modified or altered in various ways.

LIST OF REFERENCE NUMERALS

1 vehicle
2 seat
4 floor
5 seat cushion
6 seatback
8 seat body
9 seat rotation device
11 seatback frame
15 side member
16 upper member
17 lower member
20 occupant support device
21 notification device
23 movable frame device
24 movable frame
25 electric motor
27 seatback side portion
28 seatback central portion
31 vibrator
32 speaker
33 touch panel display
41 air cell device
42 air cell
44 lumber support
47 support plate
61 tilt plate device
62 tilt plate
63 tilting device
71 steering wheel
75 travel control device
76 seat control device
90 information acquisition device
110 Doppler sensor

The invention claimed is:
1. A vehicle seat provided in a vehicle, comprising:
a seat body including a seat cushion and a seatback;
an occupant support device displaceably provided on the seat body to press an occupant seated on the seat body;
a notification device provided on the seat body to make notification to the occupant;
an information acquisition device that acquires information including at least one of a surrounding environment of the vehicle and a driving state of the vehicle; and
a control device that controls the occupant support device and the notification device based on the information,
wherein the notification device is provided on the occupant support device,
wherein the occupant support device and the notification device are each provided as a pair on left and right,
the notification device is a vibrator,
the information acquisition device comprises a turning state acquisition device that acquires a turning state of the vehicle, including a turning direction, and when the vehicle turns, the control device causes the vibrator disposed on a side opposite from a turning direction to vibrate, based on the turning state, when the vehicle turns.

2. The vehicle seat according to claim 1, wherein the seat body is provided to be rotatable about a vertical axis relative to a floor of the vehicle.

3. The vehicle seat according to claim 2, wherein the information acquisition device comprises a seat rotation angle sensor that detects a rotation angle of the seat body relative to the floor about the vertical axis, and
the control device reduces an amount of actuation of the occupant support device when the rotation angle is large than when the rotation angle is small.

4. The vehicle seat according to claim 3, wherein the information acquisition device comprises a turning state acquisition device that acquires a turning state of the vehicle, and
when the vehicle turns, the control device causes the seat body to rotate about the vertical axis in a direction same as a turning direction.

5. The vehicle seat according to claim 4, wherein the occupant support device is provided as a pair on left and right, and
when the vehicle turns, the control device actuates the occupant support device disposed on a side different from the turning direction.

6. The vehicle seat according to claim 1, wherein the information acquisition device comprises a gripping sensor provided on a steering wheel of the vehicle, and
the control device reduces an amount of actuation of the occupant support device when the steering wheel is gripped by the occupant than when the steering wheel is not gripped.

7. The vehicle seat according to claim 1, wherein the information acquisition device comprises a wakefulness degree acquisition device that detects a wakefulness degree of the occupant, and
the control device reduces an amount of actuation of the occupant support device when the wakefulness degree is high than when the wakefulness degree is low.

8. The vehicle seat according to claim 7, wherein the information acquisition device comprises a pressure sensor that is provided on the seat body to detect a pressure received from the occupant, and
the control device reduces the amount of actuation of the occupant support device when the pressure is high than when the pressure is low.

9. The vehicle seat according to claim 1, wherein the information acquisition device comprises an obstacle sensor that detects an obstacle present around the vehicle, and
the control device reduces an amount of actuation of the occupant support device when a distance between the vehicle and the obstacle is short than when the distance between the vehicle and the obstacle is long.

10. The vehicle seat according to claim 1, wherein the occupant support device comprises an air cell that inflates when compressed air is supplied and a support plate provided at a front end of the air cell, and
the notification device comprises a vibrator provided on a side of the support plate opposite from an air cell side.

* * * * *